US008788696B2

(12) United States Patent
Swaminathan et al.

(10) Patent No.: US 8,788,696 B2
(45) Date of Patent: *Jul. 22, 2014

(54) MEDIA CONTENT STREAMING USING STREAM MESSAGE FRAGMENTS

(71) Applicant: Adobe Systems Incorporated, San Jose, CA (US)

(72) Inventors: Viswanathan Swaminathan, Saratoga, CA (US); Saayan Mitra, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,413

(22) Filed: Mar. 7, 2013

(65) Prior Publication Data

US 2013/0191489 A1    Jul. 25, 2013

Related U.S. Application Data

(63) Continuation of application No. 12/542,552, filed on Aug. 17, 2009, now Pat. No. 8,412,841.

(51) Int. Cl.
G06F 15/16 (2006.01)

(52) U.S. Cl.
USPC ............................ 709/231; 709/203; 709/236

(58) Field of Classification Search
USPC .................................. 709/230, 231, 236, 203
See application file for complete search history.

(56) References Cited

U.S. PATENT DOCUMENTS

| 5,751,968 | A | 5/1998 | Cohen |
| 5,805,804 | A | 9/1998 | Laursen et al. |
| 5,841,432 | A | 11/1998 | Carmel et al. |
| 5,892,915 | A | 4/1999 | Duso et al. |
| 6,044,205 | A | 3/2000 | Reed et al. |
| 6,064,379 | A | 5/2000 | DeMoney |
| 6,085,252 | A | 7/2000 | Zhu et al. |
| 6,112,024 | A | 8/2000 | Almond et al. |
| 6,148,334 | A | 11/2000 | Imai et al. |
| 6,163,796 | A | 12/2000 | Yokomizo |
| 6,216,157 | B1 | 4/2001 | Vishwanath et al. |
| 6,397,230 | B1 | 5/2002 | Carmel et al. |
| 6,453,355 | B1 | 9/2002 | Jones et al. |
| 6,477,580 | B1 | 11/2002 | Bowman-Amuah |
| 6,487,564 | B1 | 11/2002 | Asai et al. |
| 6,549,934 | B1 | 4/2003 | Peterson et al. |
| 6,631,418 | B1 | 10/2003 | Watkins |

(Continued)

OTHER PUBLICATIONS

"Advantages of On2 VP6 Technology", *On2 Technologies White Paper document version 1.3*, (Oct. 20, 2006), 18 Pages.

(Continued)

*Primary Examiner* — David Lazaro
(74) *Attorney, Agent, or Firm* — Wolfe-SBMC

(57) ABSTRACT

Methods, systems, and apparatus, including computer programs encoded on a computer storage medium, for media content streaming can include transacting access information associated with a media stream and transacting one or more fragments associated with the media stream to facilitate a delivery of media content associated with the media stream. Access information can include fragment sequencing information to facilitate individual retrieval of fragments associated with the media stream using a uniform resource identifier via a processing device configured to cache content. A fragment can include one or more stream messages. A stream message can include a message header and a corresponding media data sample. The message header can include a message stream identifier, a message type identifier, a timestamp, and a message length value.

20 Claims, 7 Drawing Sheets

(56) References Cited

U.S. PATENT DOCUMENTS

| | | |
|---|---|---|
| 6,760,378 B1 | 7/2004 | Conklin |
| 6,763,390 B1 | 7/2004 | Kovacevic et al. |
| 6,801,947 B1 | 10/2004 | Li |
| 6,823,394 B2 | 11/2004 | Waldvogel et al. |
| 6,877,010 B2 | 4/2005 | Smith-Semedo et al. |
| 6,985,932 B1 | 1/2006 | Glaser et al. |
| 6,990,497 B2 | 1/2006 | O'Rourke et al. |
| 6,999,424 B1 | 2/2006 | Kovacevic et al. |
| 7,003,570 B2 | 2/2006 | Messinger et al. |
| 7,133,922 B1 | 11/2006 | She et al. |
| 7,149,813 B2 | 12/2006 | Flanagin et al. |
| 7,272,658 B1 | 9/2007 | Edelman et al. |
| 7,383,289 B2 | 6/2008 | Kraft |
| 7,548,948 B2 | 6/2009 | Klemets et al. |
| 7,716,345 B2 | 5/2010 | Klemets |
| 8,412,841 B1 | 4/2013 | Swaminathan et al. |
| 2001/0004417 A1 | 6/2001 | Narutoshi et al. |
| 2002/0055989 A1 | 5/2002 | Stringer-Calvert et al. |
| 2002/0065926 A1 | 5/2002 | Hackney et al. |
| 2002/0103815 A1 | 8/2002 | Duvillier et al. |
| 2002/0116716 A1 | 8/2002 | Sideman |
| 2003/0046431 A1 | 3/2003 | Belleguie |
| 2003/0061369 A1 | 3/2003 | Aksu et al. |
| 2003/0115268 A1 | 6/2003 | Esposito |
| 2003/0154239 A1 | 8/2003 | Davis et al. |
| 2003/0187993 A1 | 10/2003 | Ribot |
| 2003/0221014 A1 | 11/2003 | Kosiba et al. |
| 2004/0032424 A1 | 2/2004 | Florschuetz |
| 2004/0098533 A1 | 5/2004 | Henshaw et al. |
| 2004/0215803 A1 | 10/2004 | Yamada et al. |
| 2005/0102427 A1 | 5/2005 | Yokota et al. |
| 2006/0161516 A1 | 7/2006 | Clarke et al. |
| 2006/0224687 A1 | 10/2006 | Popkin et al. |
| 2008/0256255 A1 | 10/2008 | Mordovskoi et al. |
| 2009/0106386 A1 | 4/2009 | Zuckerman et al. |
| 2009/0271525 A1 | 10/2009 | Jung et al. |
| 2010/0318600 A1 | 12/2010 | Furbeck |

OTHER PUBLICATIONS

"What is Streaming Media and How Does it Work?", *RealNetworks*, http://service.real.com/help/player/plus_manual.g2/htmlfiles/whatisrp.htm, Accessed Jul. 18, 2007,(1999), 19 Pages.

"Common Multimedia Formats and Extentions", *Sorenson Media* http://www.sorensontech.com/learn/video_file_format.php, Accessed Jul. 18, 2007, 2 Pages.

"TrueMotion VP7 Video Codec", *On2 Technologies white paper Document Version 1.0*, (Jan. 10, 2005), 13 Pages.

"Real Time Messaging Protocol Chunk Stream", *Adobe Systems Inc.*, (Apr. 2009), 70 Pages.

"Information Technology—Coding of Audio-Visual Objects; Part 12: ISO Base Media File Format", *International Standard ISO/IEC 14496-12*, Second edition Apr. 1, 2005—Corrected Version Oct. 1, 2005,(Apr. 1, 2005), 94 Pages.

"Quicktime Streaming Server Administrator's Guide", http://manuals.info.apple.com/en/quicktimestreamingsrvradminguide.pdf, Apple Computer Inc.,(2002), 84 Pages.

Schulzrinne, et al., "Real Time Streaming Protocol", *The Internet Society*, (1998), 86 Pages.

Swaninathan, et al., "US Patent", U.S. Appl. No. 12/542,582, filed Aug. 17, 2009, to be published by the USPTO,(Aug. 17), 38 Pages.

"Non Final Office Action", U.S. Appl. No. 12/542,552, (Dec. 13, 2010), 7 Pages.

"Non Final Office Action", U.S. Appl. No. 12/542,552, (May 26, 2011), 7 Pages.

"Final Office Action", U.S. Appl. No. 12/542,552, (Jan. 20, 2012), 10 Pages.

"Notice of Allowance", U.S. Appl. No. 12/542,552, (Nov. 27, 2012), 7 Pages.

MEDIA CONTENT STREAMING USING STREAM MESSAGE FRAGMENTS

RELATED APPLICATIONS

This Application claims priority under 35 U.S.C. Section 120 as a continuation of U.S. patent application Ser. No. 12/542,552, filed Aug. 17, 2009, and titled Media Content Streaming, the entire disclosure of which is hereby incorporated by reference in its entirety.

BACKGROUND

This specification relates to streaming media content.

A networked server can stream media content to one or more computers connected to a communication network. Various examples of media content include video, audio, text, and combinations thereof. A computer can request and receive a media content. A computer can render media content to an output device such as a video display, speaker, or a printer.

Processing devices such as a computer or a server can use one or more protocols to exchange media content. For example, some processing devices can use a protocol such as the Real-Time Messaging Protocol (RTMP) of Adobe Systems Incorporated of San Jose, Calif. to send media content over a network such as one based on an Internet Protocol (IP). RTMP can provide multiplexing and packetizing services for a higher-level multimedia stream protocol. RTMP messages can include a timestamp and payload type identification information. Protocols such as RTMP can use a reliable transport protocol such as Transmission Control Protocol (TCP) to provide guaranteed timestamp-ordered end-to-end delivery of messages, across one or more streams.

Some processing devices can use a Web protocol such as a Hypertext Transfer Protocol (HTTP) to request and receive information such as a document or at least a portion of a document. Some HTTP requests can identify a specific document. Processing devices can transact HTTP data over TCP/IP.

SUMMARY

This specification describes technologies relating to Web based media content streaming.

In one aspect, methods for media content streaming can include transacting access information associated with a media stream and transacting one or more fragments associated with the media stream to facilitate a delivery of media content associated with the media stream. Access information can include fragment sequencing information to facilitate individual retrieval of fragments associated with the media stream using a uniform resource identifier via a processing device configured to cache content. A fragment can include one or more stream messages. A stream message can include a message header and a corresponding media data sample. The message header can include a message stream identifier, a message type identifier, a timestamp, and a message length value. Other implementations can include corresponding systems, apparatus, and computer programs, configured to perform the actions of the methods, encoded on computer storage devices.

These and other implementations can include one or more of the following features. Transacting one or more of the fragments associated with the media stream can include sending the one or more of the fragments to the processing device. A processing device can be configured to cache fragments associated with the media stream and to deliver cached fragments to a remote device using a Hypertext Transfer Protocol (HTTP). Access information can include identities of multiple servers, including the processing device, configured to cache one or more fragments associated with the media stream. These and other implementations can include causing the remote device to request different fragments from different ones of the servers, and to assemble requested fragments to play at least a portion of the media stream.

These and other implementations can include producing one or more additional fragments based on an incremental media data addition to the media stream, providing updated access information to a remote device to reflect the one or more additional fragments, and causing the processing device to cache the one or more additional fragments. Fragment sequencing information can include one or more fragment time durations and a number of fragments associated with each fragment time duration. Fragment sequencing information can be arranged to indicate a fragment play order. A message header can be formatted in accordance with a Real-Time Messaging Protocol (RTMP).

These and other implementations can include comprising causing a remote device to process media data based on the information contained in at least one message header. One or more of the fragments can include a RTMP message associated with audio data interleaved with a RTMP message associated with video data. Access information can include a segment run table to identify runs of segments and a fragment run table to identify runs of fragments. The fragment run tables can include the fragment sequencing information.

In another aspect, methods for media content streaming can include causing a server cluster to store media content. The media content can include fragments associated with a media stream. A fragment can include stream messages, where separate ones of the stream message can include a message header and a corresponding media data sample. A message header can include a message stream identifier, a message type identifier, a timestamp, and a message length value. These methods can include receiving a request associated with the media stream from a remote device using a Web protocol. These methods can include sending access information associated with the media stream to the remote device using a Web protocol. The access information can include fragment sequencing information to facilitate individual fragment retrieval by the remote device. These methods can include causing the server cluster to process a fragment request from a remote device that identifies one or more of fragments associated with a media stream, and to send the one or more identified fragments to the remote device using a Web protocol. Other implementations can include corresponding systems, apparatus, and computer programs, configured to perform the actions of the methods, encoded on computer storage devices.

Particular embodiments of the subject matter described in this specification can be implemented so as to realize one or more of the following advantages. Media content streaming throughput can be increased. HTTP can be used to stream media content, and HTTP network infrastructure and HTTP client software can be leveraged. Moreover, enhanced media viewing capabilities such as quick start, low latency, and faster seeking capabilities can be provided to remote devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
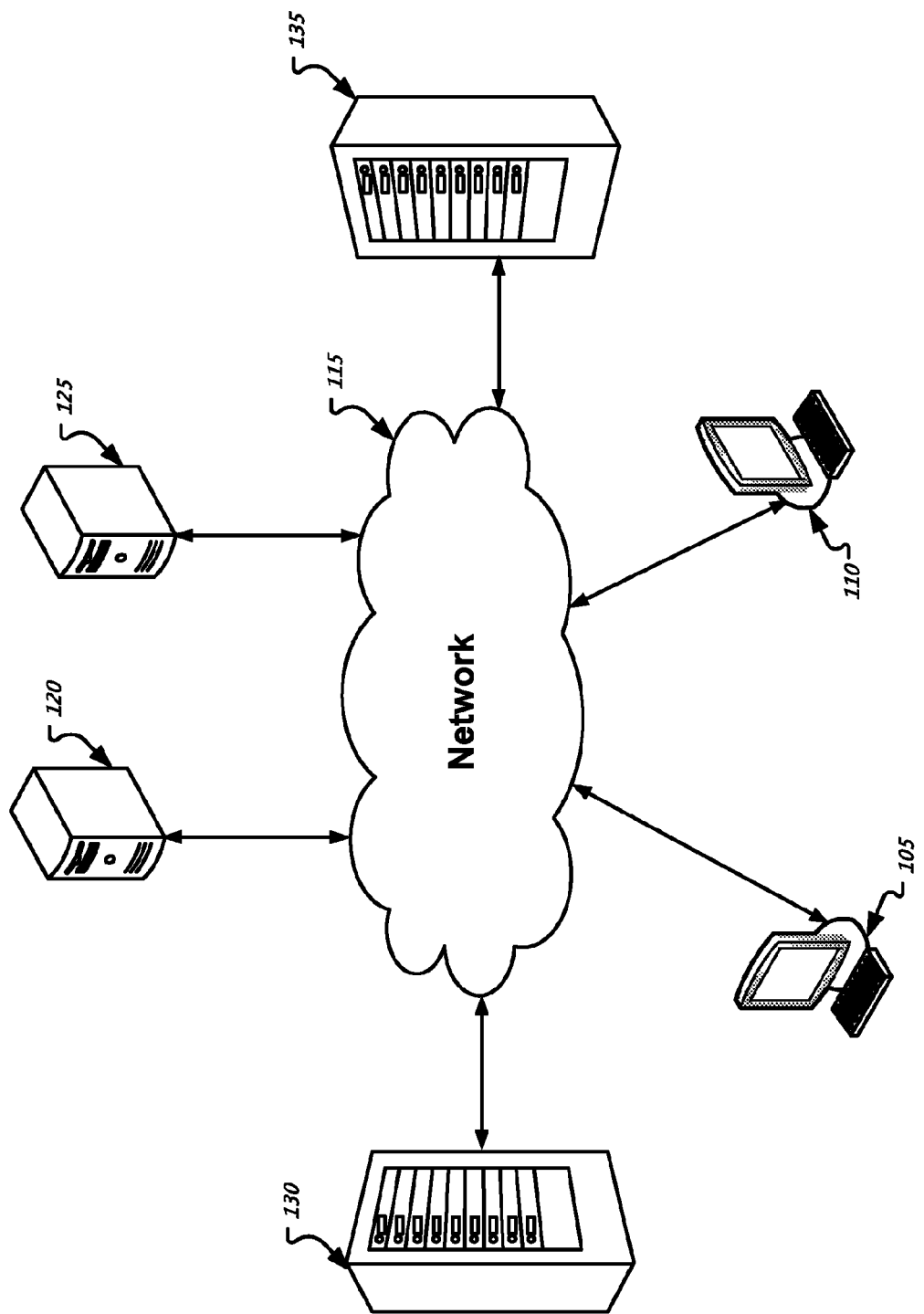
FIG. 1 shows an example of a communication network connected with processing devices.

FIG. 1 shows an example of a communication network connected with processing devices. Processing devices such as network endpoints 105, 110, 120, 125, 130, 135 can connect to a communication network 115 such as the Internet or a Local Area Network (LAN). Various examples of endpoints include processing devices such as a mobile phone, personal computer 105, 110 or a computer such as a server 120, 125, 130, 135. An endpoint can include one or more processors that can be programmed or configured to perform one or more operations mentioned in the present disclosure. In some implementations, a processor can include multiple processors or processor cores. A network endpoint can be identified as a client, a server, or both, but in any case, a network endpoint necessarily includes some hardware since it includes a physical device.

Endpoints 105, 110, 120, 125, 130, 135 can access electronic documents such as media documents. An electronic document (which for brevity will simply be referred to as a document) does not necessarily correspond to a file. A document may be stored in a portion of a file that holds other documents, in a single file dedicated to the document in question, or in multiple coordinated files. The document need not be a text file or a document in the sense of a word processor. The document can include audio, video, images, and data content. In other examples, the document can be any audio, video, image, or data file. Also the document can be streaming versions of the aforementioned document types.

In some implementations, a first server 120 is configured to handle initial media content requests from a computer 105, 110. In some implementations, a second server 125 is configured to stream media content. For example, a computer 105, 110 can communicate with the first server 120 to retrieve access information regarding a media stream. The access information can include contact information for the second server 125. The computer 105, 110 can use the access information to communicate with the second server 125, including requesting media fragments of the media stream.

Server clusters 130, 135 can be configured as Web caches, e.g., HTTP based caches configured to store Web content. A server cluster 130, 135 can communicate with different endpoints connected to the network 115. In some implementations, a server cluster 130, 135 can include one or more servers in a rack-mount configuration. In some implementations, a server cluster can include multiple servers located in respective different physical locations with separate physical connections to the network 115. In some implementations, a content distribution network (CDN) can include one or more server clusters 130, 135, which can be configured as a Web cache.

Endpoints 105, 110, 120, 125, 130, 135 can establish connections with other endpoints 105, 110, 120, 125. For example, servers 120, 125, 130, 135 can establish connections with other servers 120, 125, 130, 135 or with computers 105, 110. Likewise, computers 105, 110 can establish connections with other computers 105, 110 or with servers 120, 125. In some implementations, TCP/IP can be used to transport data between network endpoints 105, 110, 120, 125, 130, 135. In some implementations, network endpoints 105, 110, 120, 125 can communicate with each other using a protocol stack such as RTMP over TCP/IP. For example, a computer 105 can receive a media stream from a server 120 using RTMP. In another example, a computer 110 can request and receive different portions of a media stream from a server 125, 135 using HTTP.

A server can process a Web based request from a client device that requests media content. In some implementations, a server cluster containing multiple servers can process requests from client devices in a distributed fashion. A server can stream media content over a network such as the Internet to a client device. In some implementations, streaming media content can include accessing a segment of media content such as a movie segment and sending at least a portion of the segment to the client device in response to a HTTP request. The segment can include one or more media data samples such as audio samples, video samples, and other data samples such as text and graphics. A server can access a document such as one based at least in part on a MPEG4 format to obtain media data samples.

In some implementations, a server can fragment a MPEG4 formatted document, such as a movie, into multiple fragments in accordance with the MPEG4 specification. In some implementations, a server can store multiple versions of documents associated with a movie, with each version having a different bit rate.

Some document formats such as ones based on a MPEG4 format can support inclusion of hint information to stream or render media content. Hint information can include hint media data and can include a hint metadata track. Hint media data can include one or more hint samples. A hint sample can include a network protocol header. In some implementations, a hint sample can include a network protocol header and one or more of an audio sample, video sample, or another type of sample such as text. In some implementations, a hint sample can include a network protocol header and a pointer to a sample in a different media data area in lieu of containing the sample itself.

Servers can use hint information to process media content. In some implementations, a server can use hint media data to stream media content. A hint metadata track can contain pointers to locations of hint samples in a hint media data area of a document. In some implementations, a server can use information in a hint metadata track and corresponding hint media data container to stream media content.

In some implementations, servers can use hint information to stream media content to a client device using RTMP over TCP/IP. The client device can process the RTMP messages and render media content. In some implementations, servers can use hint information to generate one or more documents containing media content that are individually addressable by a HTTP request. A client device can receive a media stream over HTTP by requesting to receive one or more documents or portions thereof that are associated with the media stream. Such documents can include RTMP message headers and corresponding media data samples arranged for playback. The client device can receive such a document over a HTTP connection instead of a RTMP connection and can render the media data samples based on their corresponding RTMP message headers. In some implementations, a client device can be configured to process RTMP message headers and corresponding media data samples from multiple stacks such as RTMP over TCP/IP or HTTP over TCP/IP.

Figure 2:
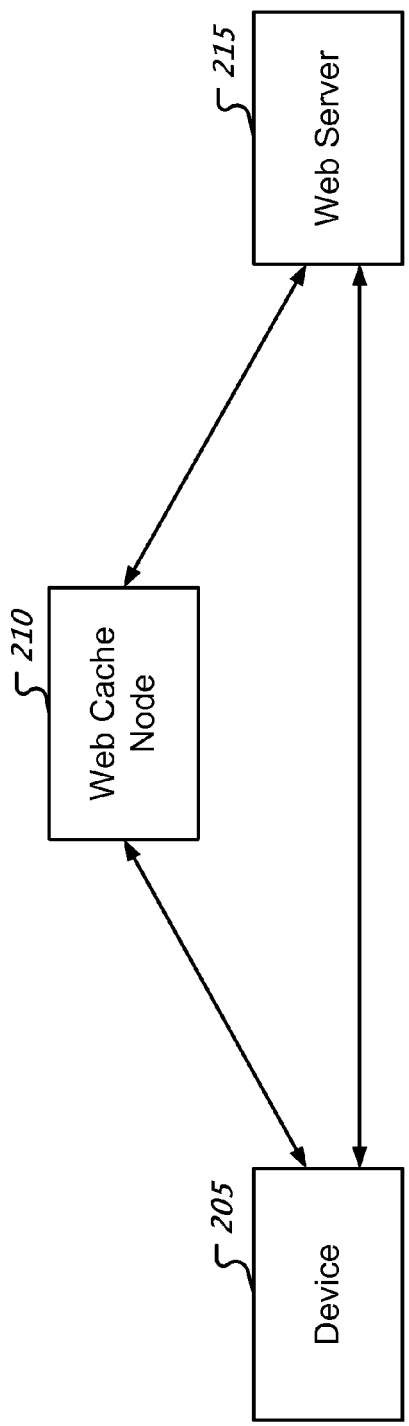
FIG. 2 shows an example of interactions between a Web server, Web cache, and a device.

FIG. 2 shows an example of interactions between a Web server, Web cache, and a device. A device 205 such as a computer, laptop, mobile phone, can interact with a Web server 215 to request media content. A Web server 215 can provide information to the device 205. The device 205 can request one or more portions of the media content. In some implementations, the device 205 can request a fragment such as a movie fragment associated with the media content. In some implementations, the device 205 can request a segment associated with the media content. In some implementations, a segment can include one or more fragments. In some implementations, the device 205 can request one or more fragments associated with the media content. A fragment can include one or more frames associated with the movie. In some implementations, the device 205 can request a range of frames associated with the media content.

In some implementations, the Web server 215 can direct the device 205 to a server such as a server configured to cache content, e.g., Web cache node 210, to retrieve at least some of the media content. In some implementations, a networked server associated with the Domain Name System (DNS) of the Internet can automatically redirect the device 205 to a Web cache node 210 situated in proximity to the device 205 based on network topology.

Figure 3:
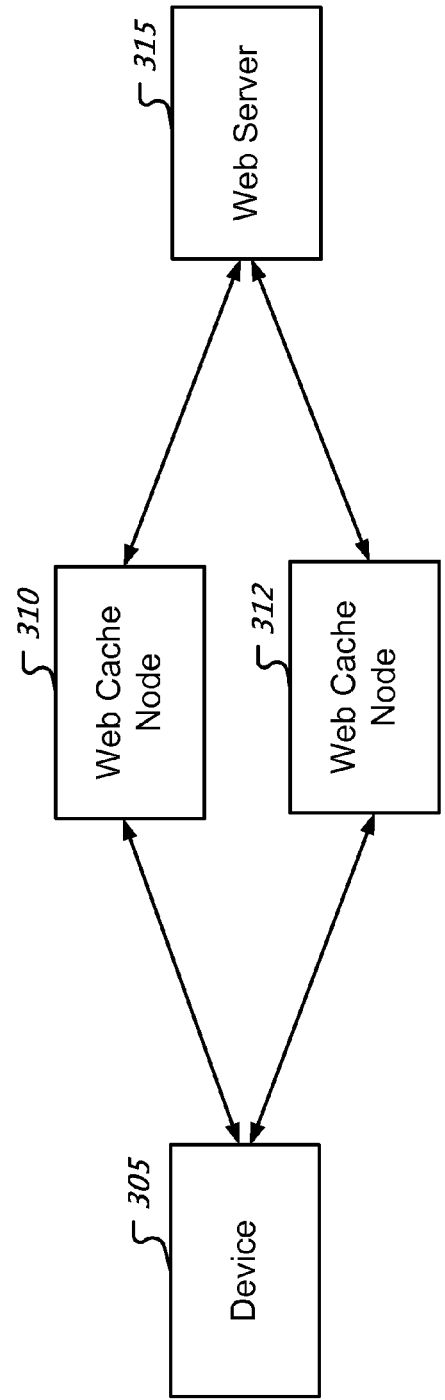
FIG. 3 shows another example of interactions between a Web server, Web cache, and a device.

FIG. 3 shows another example of interactions between a Web server, Web cache, and a device. A Web server 315 can push media content to a Web cache node 310 configured to store media content for future access. In some implementations, a Web cache 310 can intercept a request from a device 305 for specific media content, which can cause the Web cache node 310 to pull information from the Web server 315 to service the request. The Web cache node 310 can pull information from the Web server 315 based on one or more factors. For example, the Web cache node 310 can experience an initial cache miss where the Web cache 310 does not yet have the media content associated with the request. In some implementations, the Web cache node 310 can forward a request to the Web Server 315 to receive content to cure a cache miss. In another example, stored information in the Web cache node 310 can require one or more refreshes. For example, stored media content in the Web cache node 310 can be time sensitive and can require periodic updates such as additions to the content, e.g., storing media associated with a live event. In some implementations, a Web server 315 can send media content to multiple Web cache nodes 310, 312. A device 305 can receive different portions of a media stream from one or more Web cache nodes 310, 312.

Figure 4:
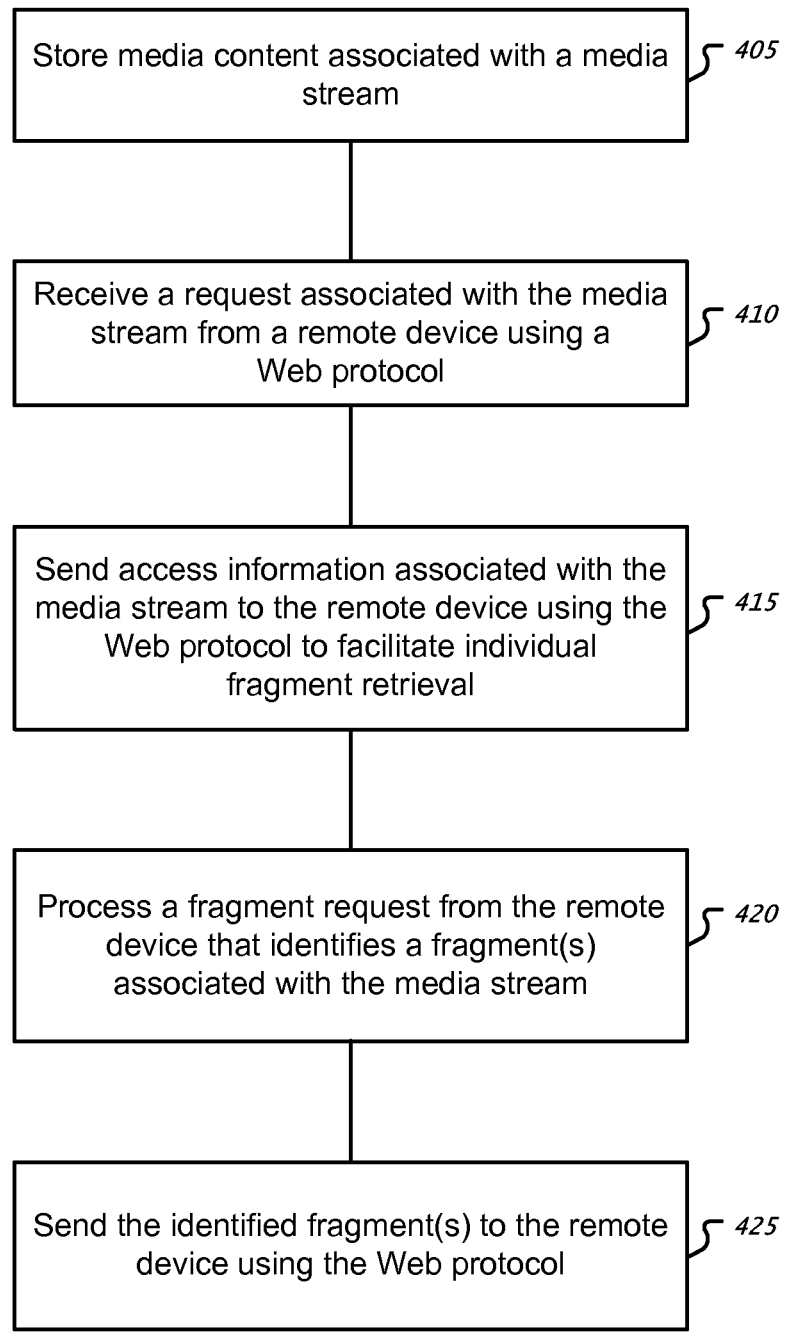
FIG. 4 shows an example of a media content distribution process.

FIG. 4 shows an example of a media content distribution process. A distribution process can include storing media content associated with a media stream (405). The server cluster can include one or more servers in one or more physical locations. In some implementations, a server can upload media content to a server cluster that includes one or more servers such as a Web Cache node. In some implementations, a server can send media content to a server cluster that has forwarded to the server a media content request from a remote device.

Media content can include fragments associated with a media stream. A fragment can include stream messages. A stream message can include a message header and a corresponding media data sample, such as an audio sample, video sample, or text sample. A message header can include a message stream identifier, a message type identifier, a timestamp, and a message length value.

The distribution process can include receiving a request associated with a media stream from a remote device using a Web protocol (410). In some implementations, a Web protocol can include HTTP. In some implementations, a Web protocol can include HTTP with one or more security features such as Hypertext Transfer Protocol Secure (HTTPS). In some implementations, a server can cause a processing device such as a Web cache to handle receiving a HTTP based request associated with a media stream.

The distribution process can include sending access information associated with the media stream to the remote device using the Web protocol (415). Access information can include fragment sequencing information to facilitate individual fragment retrieval by a remote device. In some implementations, a Web server can cause a server cluster to act on its behalf. For example, a server cluster such as one or more Web caches configured to store media content associated with a media stream can receive a request associated with the Web server and can send associated access information to the remote device.

A server can send access information to a remote device based on a request for content such as a movie. Access information can include one or more network addresses of respective sources for one or more documents associated with the requested content and can include fragment sequencing information such as bootstrapping information to assist fragment retrieval. In some implementations, media content can be associated with multiple media assets, the access information can include respective fragment sequencing information and can include an edit list.

Bootstrapping information can include fragment run information. For each continuous run of one or more fragments with the same duration, a particular run information entry can include a value denoting the number of fragments associated with a run and a fragment duration. Run information entries can be listed in a data structure in an order of play.

In some implementations, media content can include multiple separate runs of fragments with the same or different fragment durations. In a three run example, run information can include a first fragment duration and a count of fragments associated with the first run, a second fragment duration and a count of fragments associated with the second run, and a third fragment duration and a count of fragments associated with the third run. In some cases, the first and third fragment runs can have the same fragment duration, whereas the second fragment run can be of a different fragment duration.

A device can use access information such as bootstrapping information to seek. In some implementations, a technique for seeking can include converting between a media content time offset and a corresponding fragment index based on access information. The seeking technique can include requesting a fragment based on the conversion.

The distribution process can include processing a fragment request from the remote device that identifies one or more of the fragments associated with the media stream (420). In some implementations, a fragment request can include a fragment index to request a specific fragment in the media stream.

In some implementations, a fragment request can include a segment index and a fragment offset pairing in lieu of a fragment index. A fragment offset in such a fragment request can refer to a specific fragment within the segment identified by a corresponding segment index.

The distribution process can include sending the one or more identified fragments to the remote device using the Web protocol (425). In some implementations, different portions of a distribution process can take place at one or more servers. For example, a server can send media content to one or more servers which are configured to handle requests for specifics fragments.

In some implementations, access information can include one or more of: movie identifier, live broadcast indicator, media time information, version indicator, server network address, digital rights management information, a segment run table, and a fragment run table. Segment and fragment run tables can provide information to access media content such as a movie partitioned into multiple segments.

A fragment run table can describe fragments associated with media content. In some implementations, a fragment run table entry can include a first fragment index and a fragment duration for one or more fragments associated with the table entry. For example, a first fragment index can indicate an index value associated with the first fragment of a continuous run of one or more fragments that have the same duration. In some implementations, a fragment run table entry can include a value denoting the number of fragments associated with a run and a fragment duration.

A segment run table can describe segments associated with media content. In some implementations, a segment run table entry can include a first segment index and a count of one or more fragments associated with the table entry. For example, a first segment index can indicate an index value associated with the first segment of a continuous run of one or more segments with similar characteristics, e.g., a run of segments having the same count of fragments. In some implementations, a segment run table entry can include a value denoting the number of segment associated with a run and a fragment count.

A device can access media content such as a movie content or a live media stream using one or more HTTP requests to one or more servers. A device can receive data over one or more HTTP connections. The received data can include access information, and headers and corresponding sample payloads such as audio and video data associated with the requested media content. In some implementations, a device can receive access information that includes identities of one or more Web caches. In some implementations, a device can request multiple fragments from different Web caches in a concurrent fashion. The device can assemble the fragments to render at least a portion of the media stream.

Figure 5:
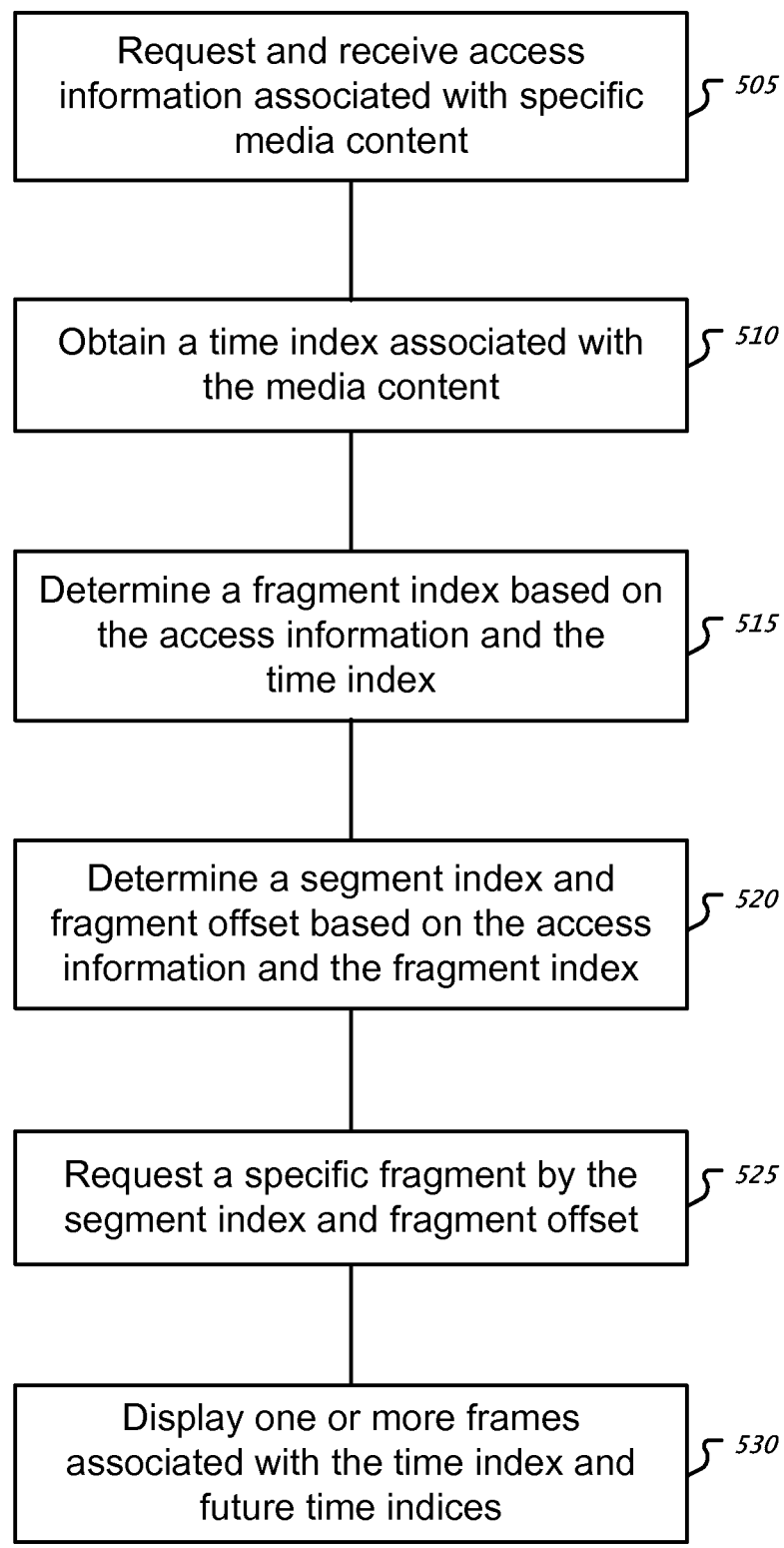
FIG. 5 shows an example of a process to request and obtain media content.

FIG. 5 shows an example of a process to request and obtain media content. A device can request and receive access information associated with specific media content such as a movie or a live media stream (505). Access information can include contact information for a server storing the media content associated with the request. Access information can include a fragment run table. In some implementations, access information can include a fragment run table and a segment run table.

The device can obtain a time index associated with the media content (510). In some implementations, the device can display a media playback control user interface region The region can include a movable positioning bar to display a playback status. A user can move the positioning bar to select an earlier or future time index for media playback. In some implementations, the device can determine a time index based on a position of the positioning bar relative to the user interface region.

The device can determine a fragment index based on the access information and the time index (515). Determining a fragment index can include computing a fragment index based on a fragment run table and the time index.

In some implementations, media content can be stored in different segments, e.g., a segment document that contain fragments. The device can convert a fragment index into a segment index and fragment offset pairing to access a specific segment document and fragment therein. The device can determine a segment index and fragment offset based on the access information and the fragment index (520). Determining a segment index can include computing a segment index based on a segment run table and the fragment index. Determining a fragment offset can include computing an offset of a fragment in a segment corresponding to the segment index, with the fragment corresponding to the fragment index.

The device can request a specific fragment by the segment index and fragment offset (525). In some implementations, the device can request a specific fragment identified by a fragment index. The device can display one or more frames associated with the time index and future time indices (530). For example, the device can start playback of a media stream at the time index. In some implementations, media playback can include determining additional fragments to request. In some implementations, media playback can include determining additional segments to request.

Some requests can include a web address that contains a resource identifier. For example, a request can include a Uniform Resource Identifier (URI). In some implementations, a URI can identify a document that contains a segment. In some implementations, a URI based request can include a Uniform Resource Locator (URL) to identify a fragment of a specific segment. For example, an endpoint can use a URL such as "http://<server>/<content_identifier>/seg27#frag4" to request the 4th fragment of the 27th segment associated with the media content identified by <content_identifier>. In another example, an endpoint can use a URL such as "http://<server>/<content_identifier>/s11-f5" to request the 5th fragment of the 11th segment associated with the media content identified by <content_identifier>. In another example, an endpoint can use a URL such as "http://<server>/seg23?fragment=5" to request the 5th fragment of the 23rd segment where the server is configured to associate incoming requests with a media content stream that has been pre-arranged such as a live media stream. In yet another example, an endpoint can use a URL such as "http://<server>/fragment270" to request a fragment index of 270.

A server can convert a document without hint information to a document that includes hint information. A server can use a format such as one described herein to generate a document with hint information. In some implementations, a server can replace media data in a document with hint information. For example, a server can use a non duplication mode to strip out media data such as video media data and audio media data and replace them with hint media data that contains their respective media sample data. In some cases, the server can modify one or more additional portions of the original document to reflect this change. In some other cases, the server can remove the metadata tracks to generate a document containing solely message headers and corresponding sample payloads. In some implementations, a standalone software routine can add hint information to a document, which can be placed on one or more servers for distribution.

In some implementations, a hint sample can include a RTMP message header. A corresponding RTMP hint metadata track can include a pointer to a hint sample, containing a RTMP message header, in RTMP hint media data. Hint media data can include hint samples associated with different media data sample types. In some implementations, a document can include a container of multiplexed hint media data including RTMP message headers and corresponding payload information. Payload information can include a payload prepared for transmission or a pointer to obtain data to construct a payload portion of a message. For example, hint media data in a document can include multiplexed audio and video information associated with a movie. RTMP packet information in a hint media data container can be arranged by timestamp.

Figure 6:
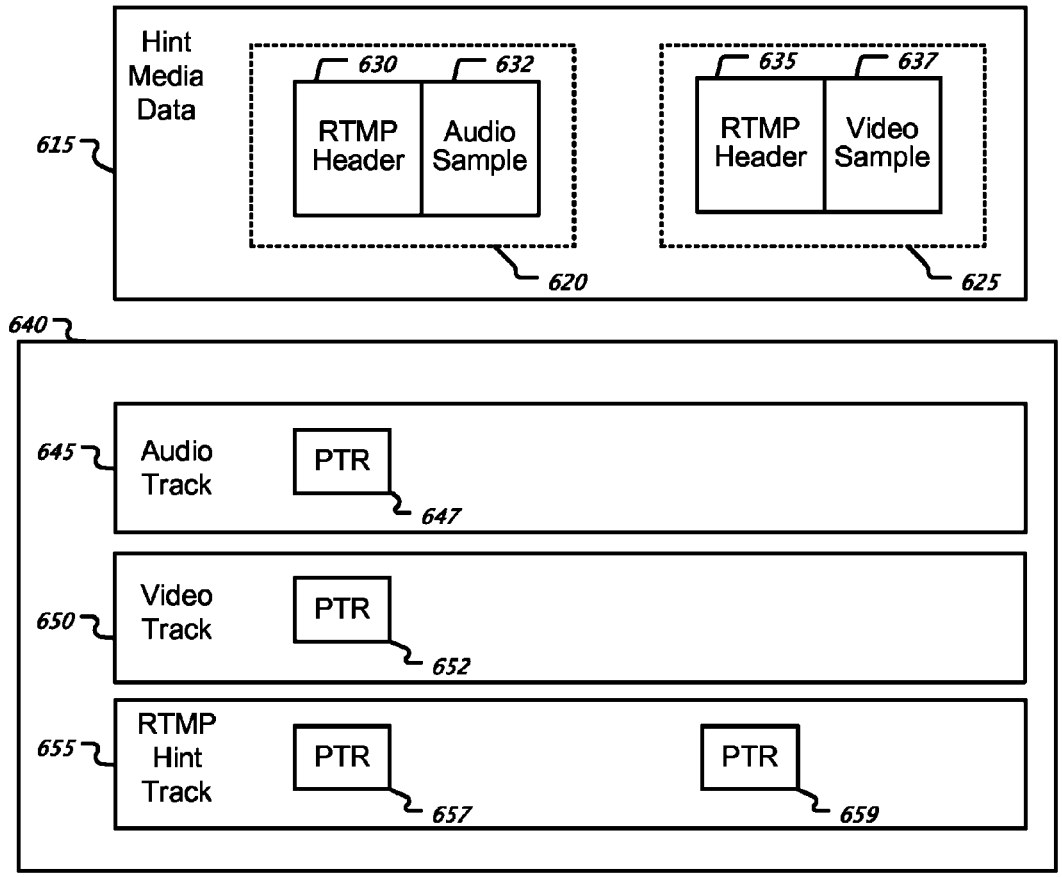
FIG. 6 shows a media document example that includes message headers and corresponding sample payloads.

FIG. 6 shows a media document example that includes message headers and corresponding sample payloads. A document can include a media segment, which can include hint media data 615. Hint media data 615 can include multiple hint samples 620, 625. A first hint sample 620 can include a header such as a RTMP message header 630 and a corresponding payload including an audio sample 632. A second hint sample 625 can include a message header such as a RTMP message header 635 and a corresponding payload including a video sample 637. In some implementations, a document can include one or more containers of media data that include duplicative samples corresponding to samples in the hint media data 615.

In some implementations, a document can include a movie box 640 to describe the contents of hint media data 615. The movie box 640 can include metadata tracks such as an audio track 645, a video track 650, and a RTMP hint track 655. Movie box 640 is not limited to describing movie data, but can describe other content. Metadata tracks 645, 650, 655 can correspond to one or more media types such as video, audio, text, or hint. In some implementations, various metadata tracks 645, 650, 655 can include pointers to locations of samples of media data in the document. In some implementations, a movie box 640 can include information about random access samples in one or more media data container.

The RTMP hint track 655 can include pointers to locations of associated hint samples 620, 625 in hint media data 615. In some implementations, hint media data 615 can interleave hint samples 620, 625 associated with different media types. For example, a hint sample associated with video can be followed by a hint sample associated with audio.

The audio track 645 can include one or more pointers 647 to respective sample locations within a media data container. For example, the audio track 645 can include a pointer 647 to a location of an audio sample 632 situated in a hint sample 620. The video track 650 can include one or more pointers 652 to respective sample locations within a media data container. For example, the video track 650 can include a pointer 652 to a location of a video sample 637 situated in a hint sample 625.

In some implementations, a document can include pointers synchronized for playback. In some implementations, pointers can be synchronized to an event or a specific time duration in media playback or streaming. For example, pointers 647, 652 in the audio and video tracks 645, 650 can be synchronized to an event. Multiple hint pointers 657, 659 in the hint track 655 can be synchronized to the same event based on their corresponding samples 632, 637 being related to the event.

Figure 7:
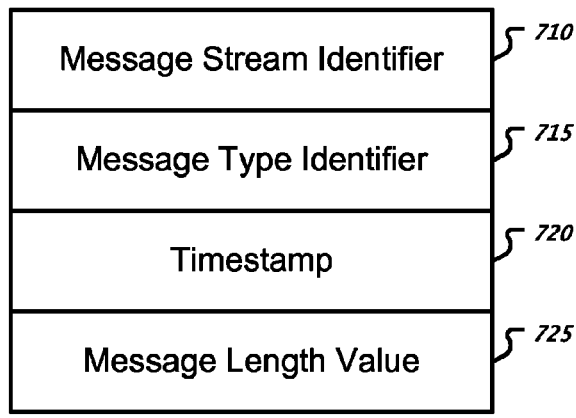
FIG. 7 shows an example of a message header in a hint sample.

FIG. 7 shows an example of a message header in a hint sample. A hint sample can include a message header such as a RTMP message header and a corresponding payload. A RTMP message header can include a message stream identifier 710, a message type identifier 715, a timestamp 720, and a message length value 725. In some implementations, a corresponding payload including data can follow a RTMP message header in a hint sample.

Figure 8:
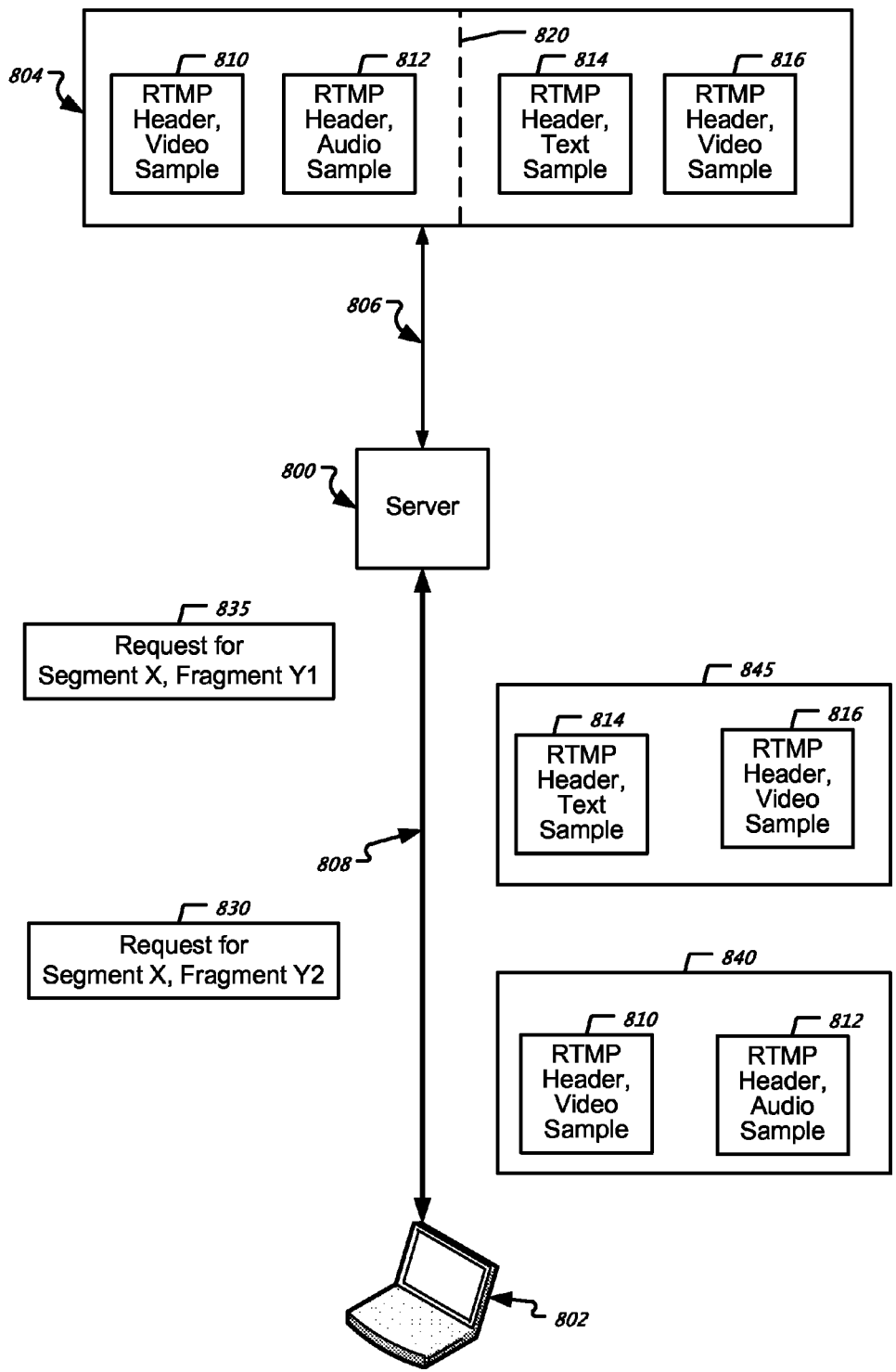
FIG. 8 shows an example of a server interacting with a device.

FIG. 8 shows an example of a server interacting with a device. A server 800 can send data via a connection 808 to a networked endpoint 802 such as a laptop or a mobile device. The server 800 and endpoint 802 can use HTTP over the connection 808 to transact requests and media content. In some implementations, the endpoint 802 can use multiple connections with one or more servers to access and receive media information.

The server 800 can access a document 804, that includes hint media data, via a data interface 806 such as a memory bus, network interface, or a disk drive interface. Hint media data can include multiple hint samples 810, 812, 814, 816 with various types of sample payloads, e.g., video, audio, text. In some implementations, hint samples 810, 812, 814, 816 are properly formatted RTMP messages. In some implementations, the server 800 can access the document 804 stored on a disk drive and can store the document 804 in memory such as a random access memory for future access. Hint samples 810, 812, 814, 816 in the document 804 can be arranged in an order sequence appropriate for playback, such as a timestamp order. Further, hint samples 810, 812, 814, 816 in the document 804 can be partitioned 820 into multiple fragments. In some implementations, different fragments can be stored separately.

Hint samples with different sample payload types can be multiplexed into a single container of hint media data, which can increase server throughput. In some implementations, a single hint segment can interleave different media types. For example, a hint data container can include hint sample payloads that respectively alternate between two or more media types. In some cases, a hint data container can include multiple video payloads followed by an audio payload.

The endpoint 802 can send requests 830, 835 for specific fragments of one or more media content segments. In some implementations, an endpoint 802 can request an entire media content segment. The server 800 can send fragments 840, 845 to the endpoint 802 based on the endpoint's requests. Fragments 840, 845 can include one or more of hint samples 810, 812, 814, 816. The endpoint 802 can render media content in an order based on RTMP timestamps in respective RTMP messages, e.g., hint samples 810, 812, 814, 816, received in one or more fragments 840, 845. In some implementations, the server 800 can perform one or more byte swap operations to prepare data packets containing fragments 840, 845 for transmission over a network. The endpoint 802 can receive fragments 840, 845 and can render media content based on the received fragments 840, 845.

Figure 9:
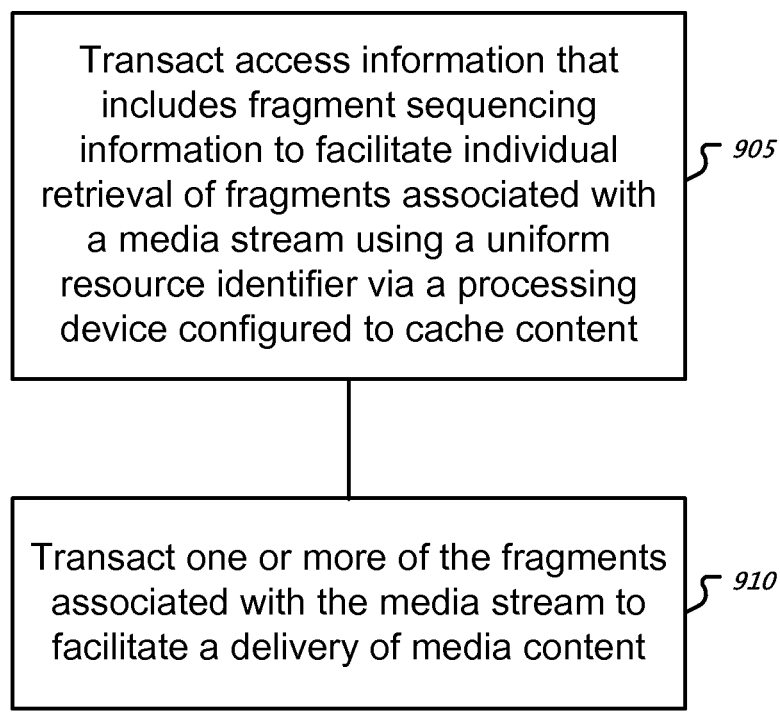
FIG. 9 shows another example of a media content distribution process.

FIG. 9 shows another example of a media content distribution process. A distribution process can include transacting access information associated with a media stream (905). Access information can include fragment sequencing information to facilitate individual retrieval of fragments associated with the media stream using a uniform resource identifier via a processing device configured to cache content. The distribution process can include transacting one or more of the fragments associated with the media stream to facilitate a delivery of media content (910). In some implementations, transacting information can include sending data to one or more processing devices such as a server. In some implementations, transacting information can include receiving data from one or more processing devices. In some implementations, transacting information can include receiving data and sending data.

A network endpoint can run one or more applications that include support for RTMP such as ADOBE® FLASH® Player and/or ADOBE® AIR® software, available from Adobe Systems Incorporated, of San Jose, Calif. For example, some servers can use RTMP to stream ADOBE® FLASH® content. In some implementations, a server such as an one configured as an ADOBE® FLASH® Media Interactive Server (FMS) can stream media content to an endpoint running ADOBE® FLASH® Player. A FMS can access a media information such as a FLASH® Video (e.g., F4V) document to obtain media content. A F4V based document can include media content and can be in accordance with an International Organization for Standardization (ISO) Base Media File Format. In some implementations, a FMS can use RTMP to stream media content to a ADOBE® FLASH® Player. In some implementations, a server such as a FMS configured to use HTTP can stream media content to a player using HTTP over TCP/IP.

In some implementations, a server can use MPEG4 movie fragments, RTMP based hint information, and access information such as a bootstrapping to provide streaming media access and connect to a client device using a Web protocol such as HTTP. A HTTP media stream can include a stream of fragments and can multiplex data such as audio and video. A fragment can include ADOBE® FLASH® content and can include media data samples of different media types and message headers multiplexed in time order in one or more RTMP streams. In some implementations, a server can insert advertisements into a media stream. Web caches such as a HTTP based Web cache can store HTTP communications from a server for faster access.

A server can receive additional data associated with a media stream, such as receiving additional frames in a live video broadcast. For example, the server can produce one or more additional fragments based on an incremental media data addition to the media content. The server can provide updated access information to a remote device to reflect the one or more additional fragments. In some implementations, the server can upload the additional fragments to a HTTP based Web cache.

In some implementations, a server can access protected media content in a document. In some implementations, a server can protect media content before distribution to clients. In some implementations, a server can use one or more digital rights management (DRM) techniques to control access privileges associated with media content. In some implementations, a server can encrypt media content and control distribution of associated key material to decrypt said media content. In some implementations, a server can use an ADOBE® DRM system, available from Adobe Systems Incorporated of San Jose, Calif.

In some implementations, a hint sample can include multiple media data samples. In some implementations, multiple hint samples can include the same media data sample. In some implementations, a container of hint media data can include hint samples with pointers to media data samples and can include hint samples with embedded media data samples. In some implementations, hint samples can be transmitted to a client, which can use the hint samples to render media content. In some implementations, a server can transmit hint samples to an intermediate endpoint which can use the hint samples to deliver media content to a client. An intermediate endpoint can use different communication techniques such as different network protocols for sending and receiving hint information. In some implementations, a server can add hint samples to a document and can cache hint samples for future use. In some implementations, segment and fragment run tables can be used with a multiplexed media format such as MPEG-2 Transport Stream (MPEG-2 TS). In some implementations, segment and fragment run tables can be used with a media format that provides for fragments with mixed samples and for fragments with or without hint information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    forming a request to access a media stream at a client device;
    using access information, by the client device, that comprises fragment sequencing information to facilitate individual retrieval of fragments associated with the media stream using a uniform resource identifier via a respective cache of media of the media stream, the fragments comprising stream messages in which separate ones of the stream messages include a media data sample and a message header that includes a message stream identifier, a timestamp, and a message length value; and consuming the media data samples of the retrieved fragments by the client device.

2. A method as described in claim 1, wherein the message header further includes a message type identifier.

3. A method as described in claim 1, further comprising receiving the access information via a network responsive to communicating the request to access the media stream.

4. A method as described in claim 1, further comprising receiving the one or more fragments using a Hypertext Transfer Protocol (HTTP).

5. A method as described in claim 1, wherein the access information comprises identities of a plurality of devices that are configured to serve one or more fragments associated with the media stream and the access information is configured to cause a remote device to request different fragments from different devices for assembly to play at least a portion of the media stream.

6. A method as described in claim 1, further comprising receiving updated access information that reflects one or more additional fragments that were generated based on an incremental media data addition to the media stream.

7. A method as described in claim 1, wherein the fragment sequencing information comprises one or more fragment time durations and a number of fragments associated with each fragment time duration, the fragment sequencing information being arranged to indicate a fragment play order.

8. A method as described in claim 1, wherein the message header is formatted in accordance with a Real-Time Messaging Protocol (RTMP).

9. A method as described in claim 1, wherein one or more of the fragments comprise a Real-Time Messaging Protocol (RTMP) message associate with audio data interleaved with a RTMP message associated with video data.

10. A method as described in claim 1, wherein the access information comprises a segment run table configured to identify runs of segments and a fragment run table configured to identify runs of fragments, the fragment run tables including the fragment sequencing information.

11. A system implemented by at least one device and configured to perform operations comprising:
receiving one or more fragments associated with a media stream, the fragments comprising stream messages in which separate ones of the stream messages include a media data sample and a message header that includes a message stream identifier, a timestamp, and a message length value; and
storing the one or more fragments in a cache that is accessible via a uniform resource identifier using access information associated with the media stream, the access information comprising fragment sequencing information configured to facilitate individual retrieval of fragments associated with the media stream using the uniform resource identifier.

12. A system as described in claim 11, wherein the message header further includes a message type identifier.

13. A system as described in claim 11, further comprising sending the one or more fragments for receipt by a client device via a network responsive to a request received from the client device, the sending facilitating access of the client device to the media stream.

14. A system as described in claim 11, wherein the fragment sequencing information comprises one or more fragment time durations and a number of fragments associated with each fragment time duration, the fragment sequencing information being arranged to indicate a fragment play order.

15. A system as described in claim 11, wherein the access information comprises a segment run table configured to identify runs of segments or a fragment run table configured to identify runs of fragments, the fragment run tables including the fragment sequencing information.

16. A system implemented by at least one device and configured to perform operations comprising:
fragmenting media data to form one or more fragments for communication as a media stream, the fragments comprising stream messages in which separate ones of the stream messages include a media data sample and a message header that includes a message stream identifier, a timestamp, and a message length value; and
generating access information that comprises fragment sequencing information configured to facilitate individual retrieval of the fragments associated with the media stream using a uniform resource identifier via a respective cache of media of the media stream, the fragments comprising stream messages in which separate ones of the stream messages include a media data sample and a message header that includes a message stream identifier, a timestamp, and a message length value.

17. A system as described in claim 16, wherein the message header further includes a message type identifier.

18. A system as described in claim 16, further comprising generating updated access information to reflect one or more additional fragments that were generated based on an incremental media data addition to the media stream.

19. A system as described in claim 16, wherein the access information comprises a segment run table configured to identify runs of segments and a fragment run table configured to identify runs of fragments, the fragment run tables including the fragment sequencing information.

20. A system as described in claim 16, wherein the access information comprises identities of a plurality of devices that are configured to serve one or more fragments associated with the media stream and the access information is configured to cause a remote device to request different fragments from different devices for assembly to play at least a portion of the media stream.

* * * * *